United States Patent Office.

HEINRICH BAUM, OF HÖCHST-ON-THE-MAIN, GERMANY, ASSIGNOR TO FARB-WERKE, VORMALS MEISTER LUCIUS & BRUNING, OF SAME PLACE.

AZO COLORING-MATTER.

SPECIFICATION forming part of Letters Patent No. 246,272, dated August 23, 1881.

Application filed June 20, 1881. (Specimens.)

*To all whom it may concern:*

Be it known that I, HEINRICH BAUM, a citizen of Germany, residing at Höchst-on-the-Main, Germany, have invented new and useful Improvements in Coloring-Matters, of which the following is a specification.

This invention relates to the production of a red dye-stuff or coloring-matter of the class known as "azo colors," and having properties different from azo colors heretofore produced, as will be hereinafter more fully explained.

In carrying out this invention I first prepare beta-naphthol monosulphonic acid by treating beta-naphthol with triple its quantity of sulphuric acid of 1.84 specific gravity at a temperature not above 25° centigrade. The product resulting from this reaction is poured into cold water and neutralized with milk of lime. After having removed the sulphate of lime, I transform in a well-known manner the calcium salt of the beta-naphthol monosulphonic acid into the sodium salt. I then take ten parts of amidoazo-benzole sulphonate of sodium and dissolve the same in two hundred parts of water first mixed with three parts of nitrite of sodium, and afterward, by degrees, with six parts of muriatic acid of 1.2 specific gravity. By these means the amidoazo-benzole sulphonate is transformed into its diazo compound, and as soon as the formation of this diazo compound is completed I add to the reaction-mixture a solution of ten parts of the above-described beta-naphthol monosulphonate of sodium in fifty parts of water mixed with ten parts of caustic water of ammonia. The coloring-matter remaining in solution is precipitated by common salt, and afterward purified, if necessary.

My new coloring-matter differs from similar azo colors heretofore produced by its free solubility in water and in dilute mineral acids. For this reason, if used for dyeing wool, it passes slowly and uniformly on the fiber.

The aqueous solution of my new dye-stuff forms no precipitate when a solution of alum is added to it. For this reason my dye-stuff has the important property to dye a fiery-red color on cotton mordanted with alum and in a continuous bath.

My new dye-stuff dissolves in sulphuric acid with a pure blue color, while the coloring-matter obtained from beta-naphthol disulphonic acid and diazo azo-benzole dissolves in sulphuric acid with a violet color, and the coloring-matter from diazo azo-benzole disulphonic acid and beta-naphthol dissolves in sulphuric acid with a green color.

I do not claim in the present application the production of the beta-naphthol monosulphonic acid above named, such being the subject-matter of a separate application for a patent.

What I claim as new, and desire to secure by Letters Patent, is—

As a new article of manufacture, the red coloring-matter or dye-stuff having the characteristics above stated.

In testimony whereof I have hereunto set my hand in the presence of two subscribing witnesses.

HEINRICH BAUM.

Witnesses:
RUDOLPH MAUER,
JORG EUGEN REVERDY.